United States Patent [19]
Breunig et al.

[11] Patent Number: 5,381,725
[45] Date of Patent: Jan. 17, 1995

[54] PRESS FOR MOLDING MEAT PRODUCTS DURING COOKING

[75] Inventors: Timothy A. Breunig, Hutchinson; James L. Bogner, Burrton; Richard B. Benson, Hutchinson, all of Kans.

[73] Assignee: Mega Manufacturing, Inc., Hutchinson, Kans.

[21] Appl. No.: 988,751

[22] Filed: Dec. 10, 1992

[51] Int. Cl.6 .......................... A22C 7/00; B30B 7/02
[52] U.S. Cl. ........................................ 99/349; 99/432; 100/194; 100/265; 100/910
[58] Field of Search .................. 99/349, 350, 351, 432; 100/215, 219, 194, 910, 265

[56] References Cited

U.S. PATENT DOCUMENTS

| | | | |
|---|---|---|---|
| 1,986,115 | 1/1935 | Offenhauser | 99/349 |
| 2,310,956 | 2/1943 | Hoy | 99/351 |
| 3,155,030 | 11/1964 | Curtis | 100/194 |
| 3,473,465 | 10/1969 | Tonjum | 99/349 |
| 3,618,511 | 11/1971 | Matthews | 99/351 |
| 3,750,563 | 8/1973 | Tonjum | 99/349 |
| 4,224,864 | 9/1980 | Wendell | 99/349 |
| 4,604,949 | 8/1986 | Giese | 100/194 |
| 4,658,718 | 4/1987 | Buller-Colthurst et al. | 99/351 |
| 4,709,446 | 12/1987 | Feauto et al. | 100/194 |
| 4,817,511 | 4/1989 | Huang et al. | 99/349 |

Primary Examiner—David A. Scherbel
Assistant Examiner—Patrick F. Brinson
Attorney, Agent, or Firm—Shook, Hardy & Bacon

[57] ABSTRACT

A meat press is provided which includes an actuating dolly and a press tree having first and second frames. The actuating dolly includes a subframe that is vertically extendable and carries cylinders that engage portions of the overlying tree when brought into registry therewith. The cylinders engage a linkage which is connected to a second frame and can cause movement thereof in a manner which exerts a compression force on a meat product loaded on the tree. The linkage is constructed and the cylinders are mounted in a manner that allows the cylinders to exert a horizontally directed pulling force on the linkage which then causes vertical movement of the second frame.

9 Claims, 6 Drawing Sheets

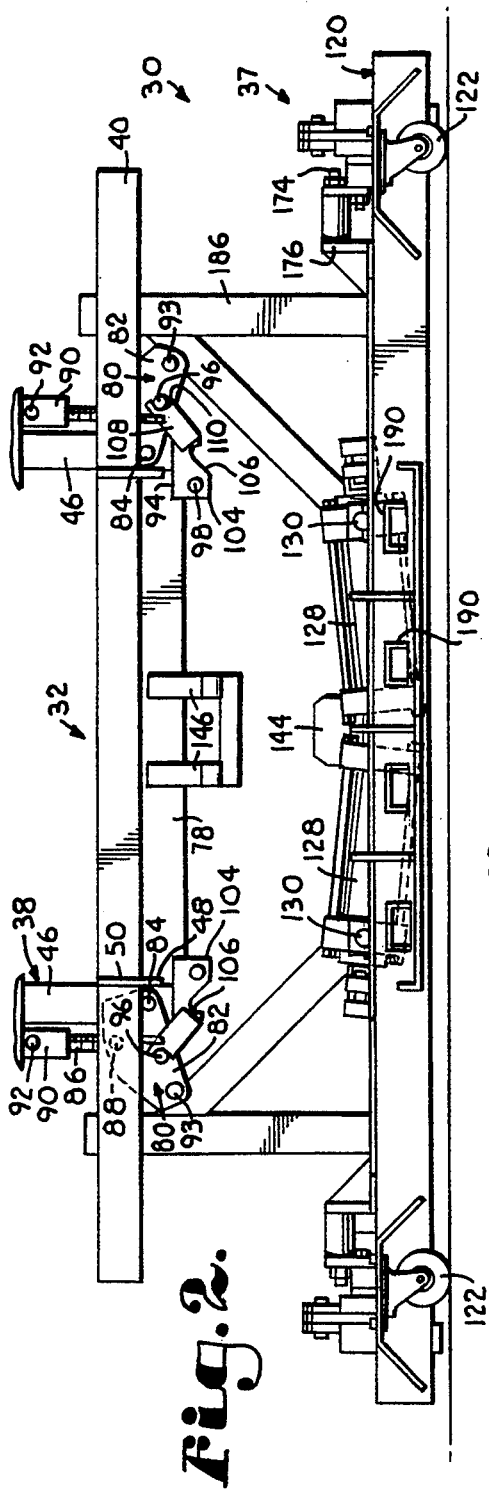
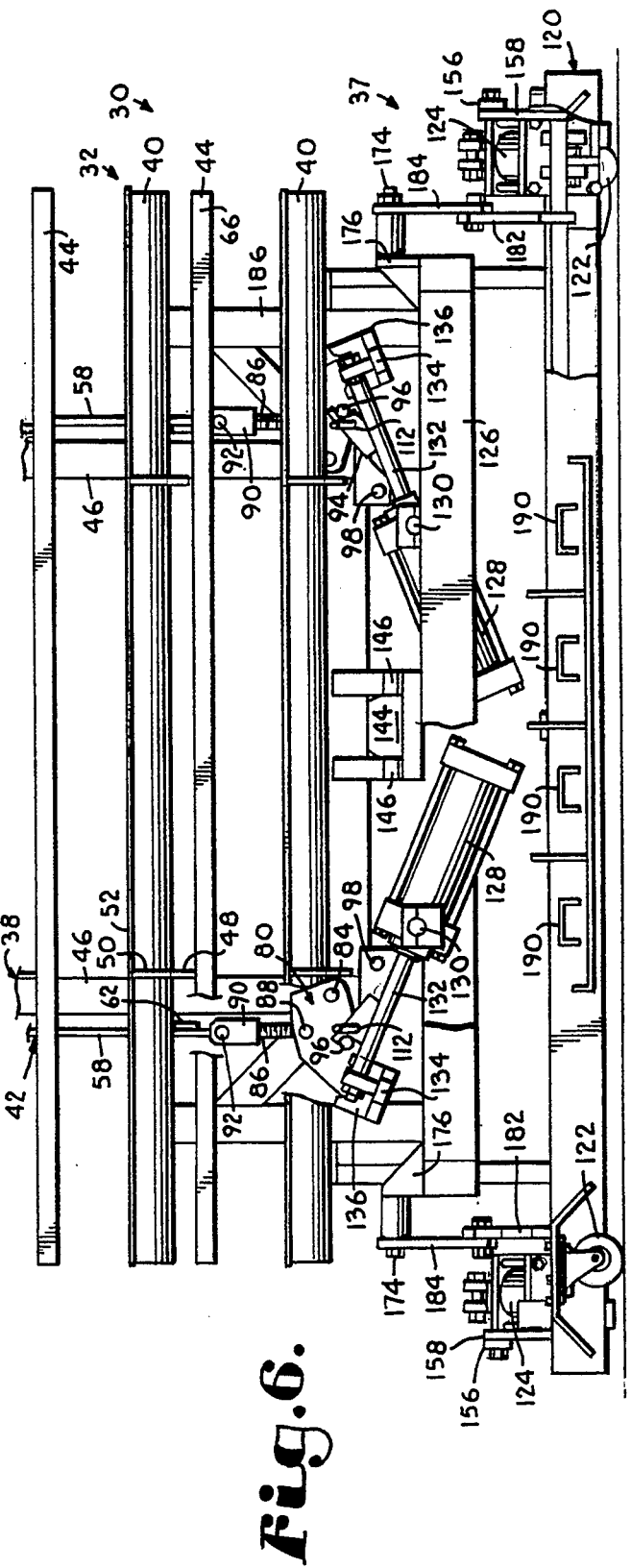

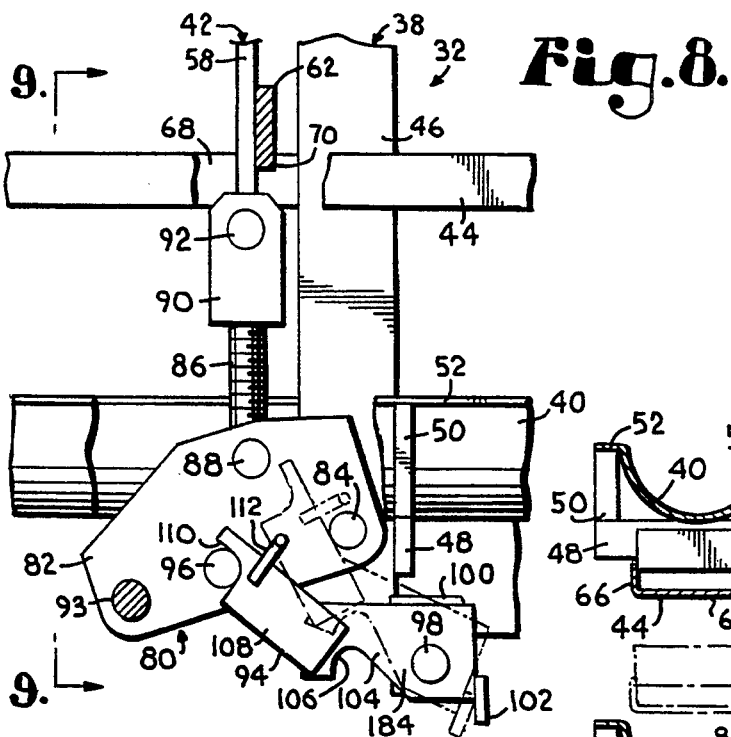
Fig.8.
Fig.9.
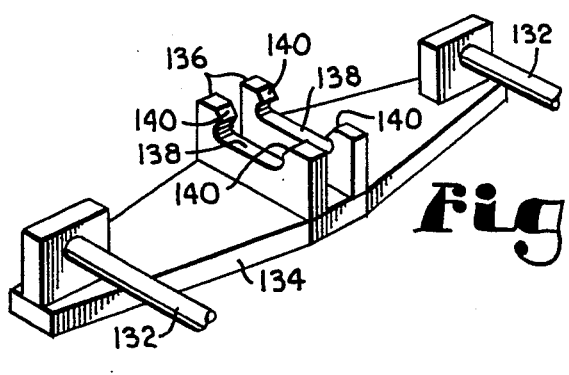
Fig.15.
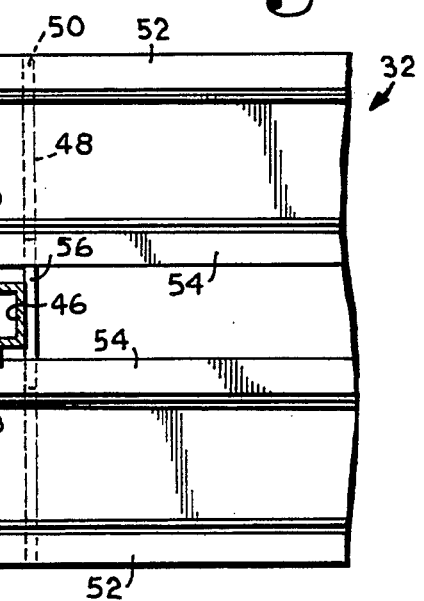
Fig.10.

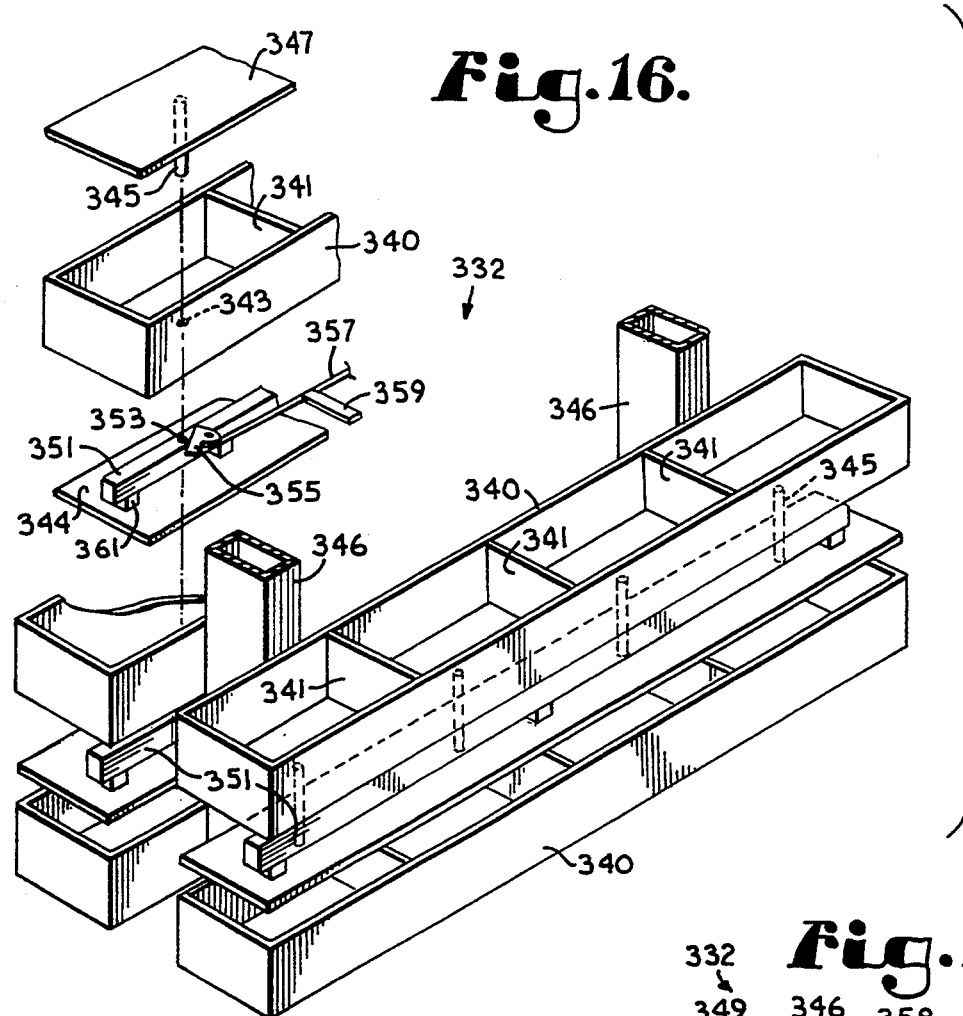
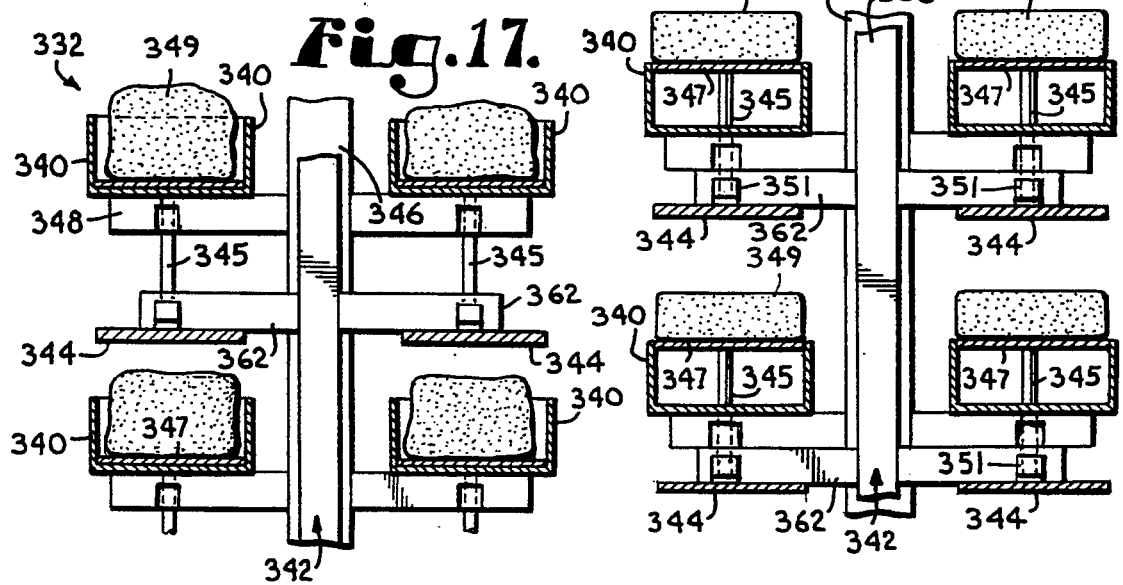

PRESS FOR MOLDING MEAT PRODUCTS DURING COOKING

BACKGROUND OF THE INVENTION

This invention relates in general to meat presses and, more particularly, to meat presses used to compress ham and other meats during cooking to form a cooked product which is molded to the desired configuration.

Meat products such as deboned hams and turkeys are frequently compressed during cooking to close the hole which is created by removal of the bone. As the meat is cooked, protein is released and solidifies between the contacting faces of the closed hole to create a unitary product. In a similar manner, a plurality of hams or turkeys, or pieces thereof, can be joined together into a unitary loaf by compressing the meat in a suitably shaped mold during cooking.

Meat presses which are conventionally used for the cooking of meat products typically comprise a screen-like support plate on which the ham or other product is placed and a pressing plate which overlies the support plate and can be moved to cause compression of the meat between the support plate and the pressing plate. Usually, meat presses mount a number of these support and pressing plates on a wheeled or rail mounted frame so that many meat products can be loaded onto the press and placed in an oven for cooking at the same time.

The conventional construction of meat presses typically utilizes an outer frame which mounts the support plates and an inner frame which is slidably mounted in relation to the outer frame and carries the pressing plates. Both the outer and inner frames comprise four vertically extending columns or posts positioned at the periphery of the support and pressing plates, respectively. A jack, air cylinder, or similar device is then used to move the inner frame in relation to the outer frame to move the pressing plates between the loading and compressing positions. When a jack is utilized, it usually remains mounted on the press while the meat is cooked in the oven. When an air or hydraulic cylinder is used, it typically is removed prior to cooking and is then replaced to unload the press.

Because the plates must span the distance between the corner posts, one problem that results from the meat press construction as described above is the tendency of the plates and frame components to deform during application of compression forces to the meat products. As a result, the force that can be applied by many presses is often less than would otherwise be desired because of the risk that the plates or portions of the frame will be bent. This problem is particularly acute when the meat product is being molded into square or otherwise shaped loafs because large compression forces must be applied to achieve a unitary molded product. If the application of large forces is necessary to cause the desired molding or shaping of the product, the presses must be constructed of heavier materials that are capable of withstanding the applied loads. The added weight, however, makes the presses more difficult to maneuver and can contribute to increased operator fatigue. In addition, the use of heavier gauge material can significantly increase the cost of the presses, particularly when expensive materials such as stainless steel are utilized. Even if the press is adequately reinforced, the repetitious application of large downwardly directed forces on the press may cause it to be dislodged from the overhead rail on which the press is mounted.

Another problem that results from conventional meat press constructions is the difficulty in achieving accurate and uniform spacing between the pressing plates and the underlying support plates or molds. Often, the frame is constructed and then the press plates and support plates are welded to their respective support posts. Even if the plates are held securely during this welding process, it is difficult to ensure that the desired spacing is maintained along the length and width of the plates. This problem is further exacerbated by the tendency of the plates to deform as a result of the heat generated during the welding process.

In order to ensure that sufficient compression force is applied to the meat product during cooking, air cylinders or similar devices are typically used to move the pressing plates from the loading to the compressed position. Various linkages can then be used to lock the plates in the compressed position during cooking. The use of such mechanical aids, however, contributes significantly to the construction costs of individual meat presses. In an effort to reduce costs, in some instances the cylinders or similar mechanism are removable so that the same cylinders can be used to open and close multiple meat presses. The removal and replacement of such cylinders, however, can be time consuming and can contribute significantly to operator fatigue.

SUMMARY OF THE INVENTION

It is an object of this invention to provide a meat press which is capable of being constructed with precise spacing between the press plates and support plates so that a uniformed shaped cooked product can be produced.

It is also an object of this invention to provide a meat press which includes a plurality of product molds for holding and forming a meat product during cooking and which is capable of delivering a uniform compression force to each meat product so that a plurality of uniformly shaped cooked products can be produced.

It is another object of this invention to provide a meat press which is capable of exerting large forces to meat products loaded thereon so that meat products can be shaped to the desired configuration.

It is a further object of this invention to provide a meat press with an actuator that can be readily connected to and disconnected from a tree portion of the press so that the actuator can be used with multiple tree portions and thereby significantly reduce the construction costs of the trees without substantially reducing the speed with which meat product can be loaded on and unloaded from the trees.

It is a still further object of this invention to provide a meat press with an actuator as described which can be connected and disconnected from the tree portion of the press with a minimum of operator effort so that the likelihood of operator fatigue and injury are significantly reduced.

It is a yet further object of this invention to provide a meat press with an actuator as described which has an extremely low profile so that the lowermost support plates on the tree portion of the press can be closely spaced to the floor and thereby increase the number of support plates that can be readily reached by the press operator.

It is still another object of this invention to provide a meat press which can be operated in a manner to positively lift the cooked product out of the mold so that unloading of the cooked product can be quickly and easily achieved.

To accomplish these and other related objects of the invention, in one aspect the invention is directed to a press for compressing meat products during cooking thereof, said press comprising:

a first frame comprising a pair of spaced apart vertically extending members;

a second frame vertically movable in relation to said first frame and comprising a pair of spaced apart vertically extending members;

a plurality of support plates positioned on said first frame;

a plurality of press plates carried on said second frame, each of said press plates being movable with said second frame between a first position spaced above an immediately underlying support plate and a second position spaced more closely to the immediately underlying support plate to cause compression of a meat product when positioned on said support plate;

a linkage connecting said first and second frames and operable to cause vertical movement of said second frame in relation to said first frame;

a cylinder mounted on a vertically extendable subframe and including an extensible and retractable rod; and a connection mounted on said cylinder rod and engagable with said linkage to cause said vertical movement of said second frame when the cylinder rod is extended and retracted.

In a separate aspect, the invention is directed to a press for compressing meat products during cooking thereof, said press comprising a first frame comprising a pair of spaced apart vertically extending members, a second frame vertically movable in relation to said first frame and comprising a pair of spaced apart vertically extending members, a plurality of support plates positioned on said first frame, a plurality of press plates carried on said second frame, each of said press plates being movable with said second frame between a first position spaced above an immediately underlying support plate and a second position spaced more closely to the immediately underlying support plate to cause compression of a meat product when positioned on said support plate, wherein some of said press plates and support plates extend along a front side of said vertically extending members of the first and second frames and others of said press plates and support plates extend along a back side of said vertically extending members of the first and second frames, and a linkage connecting said first and second frames and operable to cause vertical movement of said second frame in relation to said first frame and movement of said press plates between the first and second positions.

In a still further aspect, the invention is directed to a dolly operable to cause relative movement between first and second frames of a press used for compression meat products during cooking, said dolly comprising a base frame, a lifting cylinder mounted on the base frame, a linkage connecting the lifting cylinder with a subframe and allowing vertical extension and retraction of the subframe, an actuating cylinder mounted on the subframe and including an extensible and retractable rod, and a connection mounted on the rod of the actuating cylinder and engagable with a pulling linkage connecting the first and second frames of the press to cause relative vertical movement between the first and second frame when the actuating cylinder rod is extended and retracted.

BRIEF DESCRIPTION OF THE DRAWING

In the accompanying drawings which form a part of the specification and are to be read in conjunction therewith and in which like reference numerals are used to indicate like parts in the various views:

FIG. 2 is an enlarged side elevational view of the actuating dolly and a fragmental portion of the press tree, the dolly being shown in its retracted position and the press tree being locked in an open position to permit loading and unloading of meat;

FIG. 6 is a side elevational view of the actuating dolly and press tree and similar to the view shown in FIG. 2 but with the subframe of the dolly shown upwardly extended and engaged with the press tree in preparation for movement of the press tree into a closed configuration causing compression of a meat product when loaded onto the press tree, the press tree being shown in fragment and portions of the dolly being broken away for purposes of illustration;

FIG. 8 is an enlarged side elevational view of a fragmental portion of the press tree showing the linkage used to position the press plates carried on the tree, portions of the tree being broken away to better show the linkage and phantom lines being used to show the movement of the latch used to lock the press tree in the open and closed portions;

FIG. 9 is a fragmentary end elevational view of the press tree showing the linkage used to move the press plates and taken along line 9—9 of FIG. 8 in the direction of the arrows, phantom lines being used to shown the position of the press plates when moved by the linkage into a closed position for compressing a meat product loaded into the underlying forming molds;

FIG. 10 is an enlarged top plan view of a left portion of the press tree taken in horizontal section along line 10—10 of FIG. 1 to shown the vertically extending center beam which mounts the molds and the adjacent beam that mounts the press plates, a portion of one of the press plates being broken away to shown the underlying mold;

FIG. 15 is a fragmentary top perspective view of a catch mechanism provided on the actuating dolly and configured for engaging and exerting a substantially horizontally directed force on the press plate linkage to move the press plates to the closed configuration;

FIG. 16 is a fragmentary and partially exploded perspective view showing an alternate embodiment of the press tree having bottom plates which underlie the meat product and have push pins attached thereto to enable the meat product to be pushed out of the mold after cooking;

FIG. 17 is a fragmentary end elevational view of the press tree shown in FIG. 16 and showing the second frame that carries the press plates in an intermediate position; and FIG. 18 is a fragmentary end elevational view of the press tree and similar to the view shown in FIG. 17 but with the cooked meat product shown lifted out of the mold and supported on the bottom plates which have been elevated by the underlying press plates.

Description of the preferred Embodiments

Figure 1:
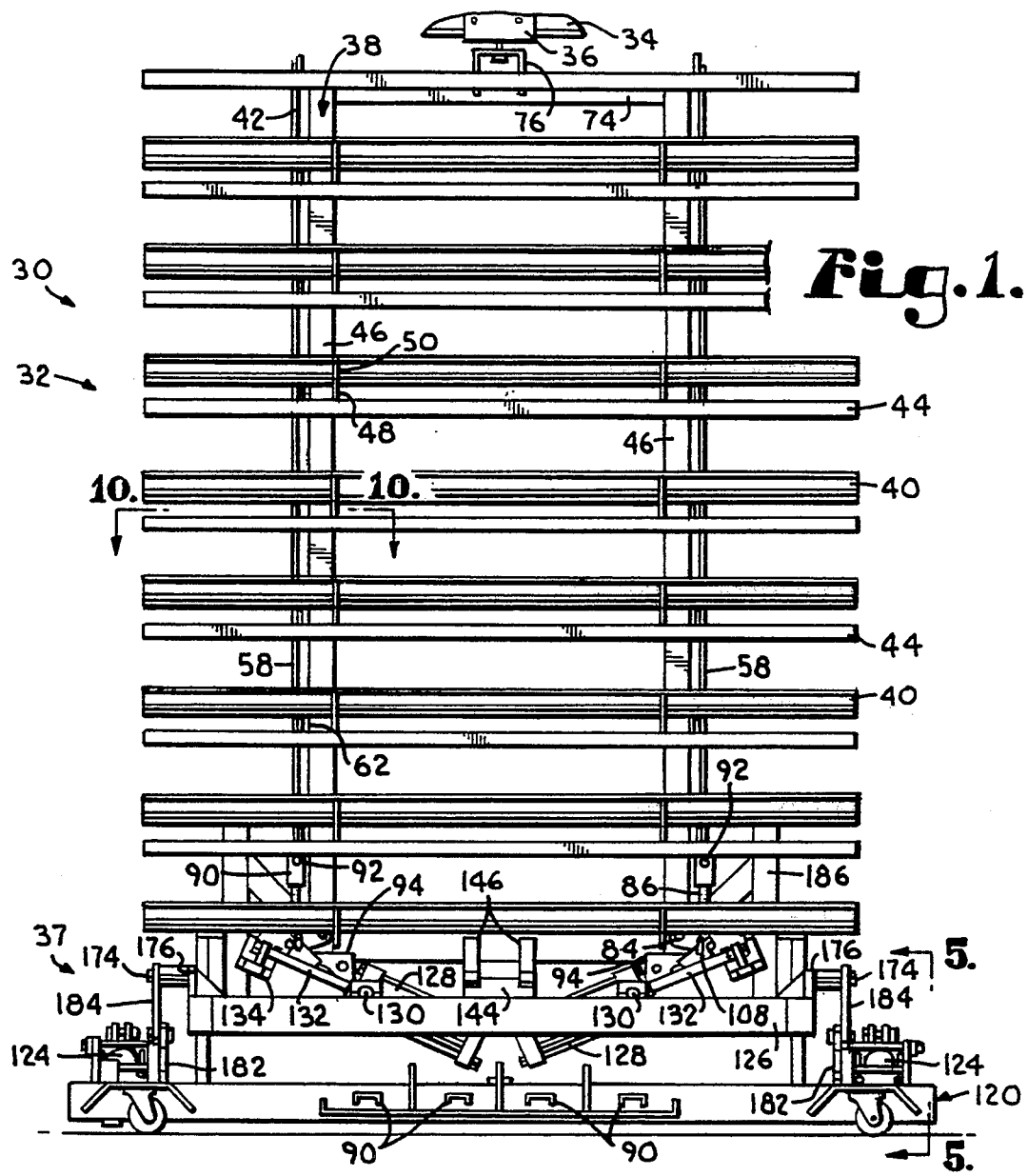
FIG. 1 is a side elevational view of a meat press tree and actuating dolly which form a meat press in accordance with the present invention.
Figure 4:
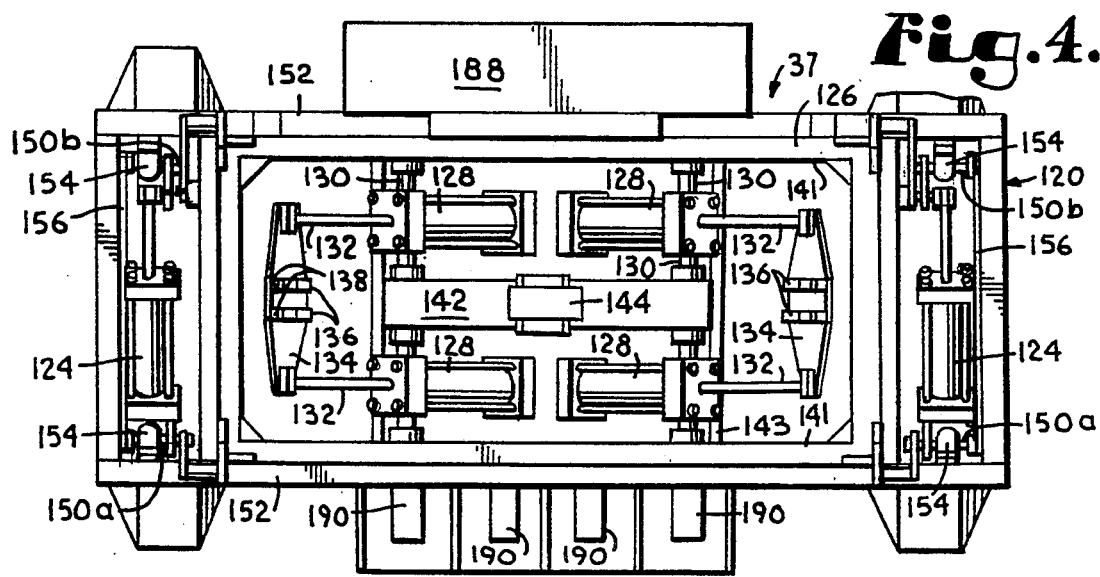
FIG. 4 is a top plan view of the actuating dolly taken along line 4—4 of FIG. 3 in the direction of the arrows, portions of the dolly being removed to more clearly show the positioning of the actuating cylinders.

Referring now to the drawings in greater detail, and initially to FIG. 1, a meat press of the present invention is designated broadly by the numeral 30 and is utilized for compressing and molding meat products during cooking to form product loafs having a preselected shape. The meat press 30 comprises a press tree 32 which is movably connected to an overhead rail 34 by a trolley 36 or other suitable mount. The meat press 30 also includes an actuating dolly 37 which can be used to move the tree 32 between open and closed configurations. As the press tree 32 is moved along the rail 34, it can be brought into registry with the actuating dolly 37 which is then used to place the tree 32 in the desired configuration to allow placement or removal of the meat products.

The press tree 32 comprises a first frame 38 that mounts a plurality of elongated product troughs or molds 40. A second frame 42 is movable in relation to the first frame 38 and carries a plurality of press plates 44. A press plate 44 overlies each product mold 40 and can be moved vertically up or down by movement of the second frame to allow loading of the meat product into the mold 40 and subsequent compression of the meat prior to cooking.

Figure 11:
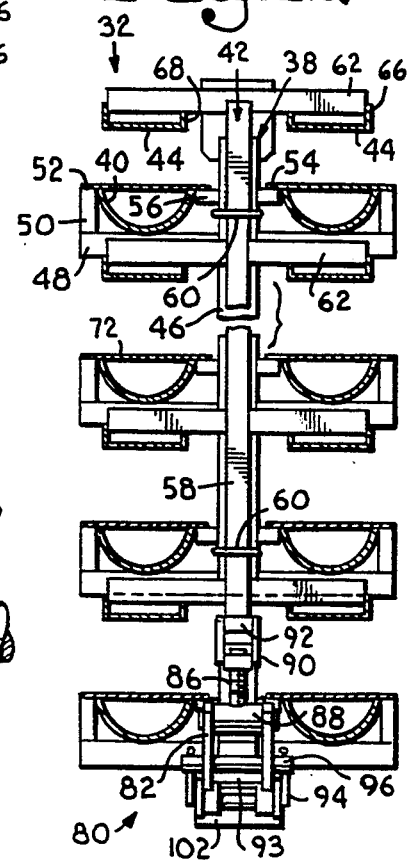
FIG. 11 is an end elevational view of the press tree in an open configuration with the press plates being spaced above the associated molds to allow positioning of a meat product in the molds or removal therefrom.
Figure 12:
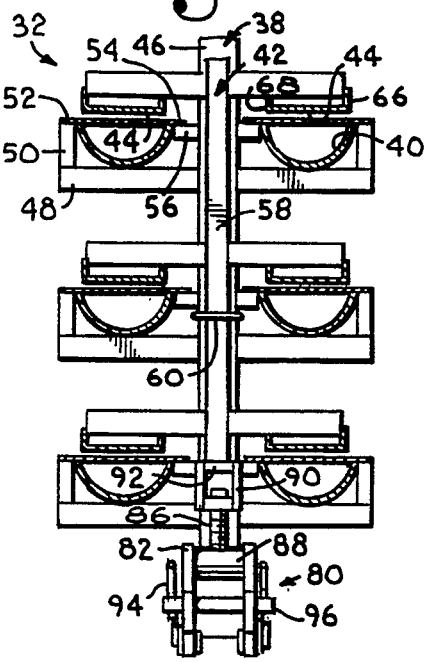
FIG. 12 is an end elevational view of the press tree and similar to the view shown in FIG. 11 but with the press plates being moved toward the molds to cause compression of the meat product when loaded in the molds.

Turning additionally to FIGS. 10–12, the first frame 38 comprises a pair of spaced apart vertical members 46 formed of square tubing or other suitably rigid material. The product molds 40 are mounted at the front and back sides of the vertical members 46 by horizontally extending flat bars 48 that are turned upright on edge.

The flat bars 48 are welded or otherwise secured at their centers to the vertical members 46 so that equal lengths of the bars 48 extend forwardly and rearwardly of the vertical members. Product molds 40 are then supported on the top edge of the flat bars 48 and are secured in a suitable fashion, preferably by welding. Desirably, each end of the product molds 40 extends longitudinally beyond the two flat bars 48 that support each mold 40 so that each mold is supported at intermediate positions rather than at its ends. Supporting the molds 40 in this manner reduces the amount of flexure that is experienced by the molds under loaded conditions and allows lighter gauge material to be used for the molds 40 as well as the bars 48.

The molds 40 are further stabilized by upright braces 50 which are fixed to the ends of the flat bars 48 and support an outer flange 52 that runs along the edge of each mold 40. An inner flange 54 on each mold 40 is also supported by a horizontally extending brace 56 that is mounted to the associated vertical frame member 46. Each brace 56 preferably supports the inner flanges 54 on both molds 40 at each tier of molds.

The second frame 42 comprises a pair of vertical bars 58 that extend along the vertical members 46 of the first frame 38 and slide within guides 60 that are spaced along the vertical members 46. Each vertical bar 58 mounts a plurality of horizontally extending bars 62 that in turn mount the press plates 44. The horizontal bars 62 are welded at their center portions to the vertical bars so that equal portions extend forwardly and rearwardly of the vertical bars 58. The horizontal bars 62 preferably comprise flat bars that are turned upright on edge.

The press plates 44 comprise a generally flat center portion 64 sized to substantially cover and cause flattening of the meat product when loaded in the underlying the mold 40. It will be appreciated that the center portion 64 can alternatively have an arcuate or other configuration that will produce the desired shaped for the cooked meat product. Outer and inner upturned flanges 66 and 68 are formed along the longitudinal side edges of the mold center portion 64 to strengthen the plates 44. The flanges 66 and 68 also serve to mount the plates 44 to the associated horizontal bar 62.

Advantageously, the inner flange 68 on each press plate 44 includes cutouts 70 which are positioned to receive a lower edge of the horizontal bars 62 that mount the press plates 44 to the vertical bars 58 of the second frame 42. The cutouts 70 allow the press plates 44 to be moved slightly up and down on the horizontal bars 62 before the press plates 44 are actually welded to the horizontal bars 62. This allows the exact spacing between the press plates 44 and underlying molds 40 to be achieved in a final stage of the manufacturing process, thereby compensating for any deformations in the various frame components that commonly result from the fabrication process. In a preferred procedure for attaching the press plates 44 to the horizontal bars 62, spacer blocks are placed in the molds 40, the press plates 44 are placed on the spacer blocks, and the horizontal bars 62 are lowered into the cutouts 70 on the press plates. Any vertical misalignment between the bars 62 and plates 44 can be compensated for as the bars 62 extend within the cutouts 70. The press plates 44 are then held in position as the inner flange 68 is welded or otherwise secured to the associated horizontal bar 62. The outer flange 66 can then be welded to the vertical edge of the horizontal bar 62. Alternatively, the outer flange 66 can also be provided with a cutout that allows the outer flange to be secured in the same manner as the inner flange 68. It will also be apparent that the cutouts 70 could be provided in the horizontal bar 62 rather than in the flanges of the press plate. This is contemplated by and is within the scope of the invention.

The molds 40 are generally open at the ends as well as at the top. This not only facilitates loading and unloading of the meat products into the molds but also allows the molds 40 to be easily and completely cleaned because there are no corners or crevices where bacteria could collect and cause contamination of the meat product. As illustrated, the molds 40 are of a D-shaped cross-sectional configuration but it will be appreciated that other configurations, including square, rectangular, circular, or oval, can be utilized to achieve the desired cooked meat product shape. Stiffening rods. 72 may be welded across the top of the ends of the molds 40 to strengthen the molds and reduce the likelihood that the molds will be bent when inadvertently contacting a wall or other structure.

As can best be seen in FIG. 1, a beam 74 extends between the top ends of the vertical members 46 of the first frame 38. A bracket 76 is centrally positioned on the beam 74 and provides a mount for connecting the first frame 38 to the trolley 36 on the overhead rail 34. Another beam 78 extends between the lower ends of the vertical members 46 to complete the first frame 38. It will be appreciated that the press tree 32 could alternately be mounted on castors rather than the overhead rail 34.

Figure 14:
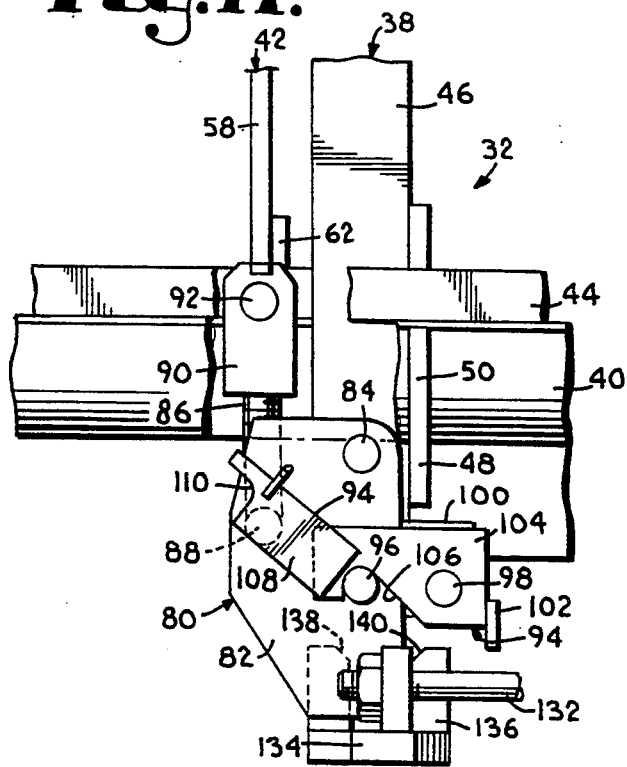
FIG. 14 is an enlarged fragmentary side elevational view of the press plate linkage similar to the view shown in FIG. 8 but showing the linkage locked in a position to maintain the press tree in the closed configuration.

Turning additionally to FIGS. 8, 9, 14, a pair of linkages 80 connect the first frame 38 with the bottom ends of each of the vertical bars 58 of the second frame 42 to control vertical movement of the second frame 42 in relation to the stationary first frame 38. Each linkage 80 includes a clevis 82 that is mounted by a pivot pin 84 to a bottom portion of the first frame 38. The clevis 82 is connected to the bottom of the second frame vertical bar 58 by an eye bolt 86 which is connected at a lower end to another pivot pin or trunnion 88 carried on the clevis 82. An upper under of the bolt 86 is threaded through a shackle 90 that includes a second trunnion 92 that is welded to the lower edge of the second frame vertical bar 58. The connection of the clevis 82 to the vertical bar 58 is such that as the clevis 82 is rotated about pivot pin 84, the trunnion 88 mounted to the lower end of the bolt 86 orbits about the clevis pivot pin 84. This orbiting movement causes the bolt 86 and thus the vertical bar 58 to move in a vertical direction, resulting in raising or lowering of the press plates 44 that are coupled with the vertical bar. It can be seen that the pivoted connections at the upper and lower ends of the bolt 86 allow the bolt 86 to tilt at an angle from the vertical as the clevis 82 is rotated and the trunnion 88 orbits about the clevis pivot pin 84.

Each clevis 82 also includes a lever pin 93 that is spaced at the opposite end of the clevis 82 from the pivot pin 84 about which the clevis pivots. As can best be seen in FIG. 8, the lever pin 93, pivot pin 84, and the trunnion 88 that connects the second frame 42 to the clevis 82 are positioned in a triangular relationship. Notably, this arrangement allows the clevis 82 to act as a lever arm so that a force applied to the lever pin 93 has an increased mechanical advantage which facilitates lifting and lowering of the second frame 42 and the press plates 44 carried thereon. In addition, the lever pin 93 is situated so that when the second frame is lowered to cause compression of the meat product, a substantial component of the force applied to the lever pin 93 is directed horizontally rather than vertically. Because the vertical component of the applied force is markedly reduced, the stress applied to the connection between the press tree 32 and the overhead rail 34 is likewise reduced. As a result, there is less likelihood that the tree 32 will be inadvertently separated from the rail 34 during raising and lower of the second frame 42.

The secondary frame 42 that carries the press plates 44 can be locked into a raised or lowered position by double latches 94 that interact with a latch pin 96 carried on each primary clevis 82. Each latch 94 is mounted by a pivot pin 98 to a pair of extensions 100 that are welded to beam 78 and extend downwardly therefrom. As is best shown in FIG. 9, a second latch 94 is mounted on the back side of the press tree 32 and is joined to the front latch 94 by a tie plate 102 so that they move in unison.

Each latch 94 comprises a first portion 104 having a catch 106 formed along a lower edge thereof. The catch 106 is sized for receiving the latch pin 96 that extends outwardly from the clevis 82 and preventing release thereof until the latch 94 is manually lifted off of the latch pin 96 as the clevis 82 is rotated in a clockwise direction as viewed in FIG. 14. When the latch pin 96 is captured in the catch 106, the second frame 42 is maintained in the lowered position with the press plates 44 held closed against the meat product loaded in the product molds 40 to cause compression of the meat product.

The latch 94 also includes a second portion 108 which extends beyond the free end of the first portion 104 and at an angle thereto. The latch second portion 108 is rigidly fixed to the first portion 104. As can best be seen in FIG. 8, the second portion 108 of latch 94 includes a catch 110 that is formed at the free end thereof. The catch 110 is shaped and positioned so that it engages the latch pin 96 when the primary clevis 82 is rotated fully clockwise as viewed in FIG. 8 to place the press plates 44 in their fully raised positions to allow loading and unloading of the meat product. When the latch pin 96 is received in the catch 110, the clevis 82 and hence the press plates 44 are locked in position and can be released only by lifting the latch 94 off of the latch pin 96. If desired, a suitable handle 112 can be mounted on the latch 94 to facilitate manipulation thereof by the press tree 32 operator. The latch 94 is preferably constructed so that the latch pin 96 supports and rides along the lower edge of the latch 94 as the clevis 82 is rotated and the latch pin 96 is moved between the catch 110 in latch second portion 108 and the catch 106 in the latch first portion 104. It can be appreciated that this allows the latch 94 to automatically lock the second frame 42 in the raised or lowered position once the clevis 82 has been rotated completely in either direction.

As can best be seen in FIG. 9, the latch second portion 108 is attached to the outer face of the latch first portion 104 so that it is spaced from the clevis 82 by the thickness of the latch first portion.

Turning additionally to FIGS. 2-7, the actuating dolly 37 which is used to move the press tree second frame 42 in relation to the first frame 38 will now be described. Dolly 37 comprises a rectangular base frame 120 such as formed by box beams that are welded together. The base frame 120 is supported on castors 122 that allow the dolly 37 to be rolled along a floor surface. As can best be seen in FIG. 4, a lifting cylinder 124 is mounted at each end of the base frame 120. The lifting cylinders 124 are coupled with a subframe 126 which is sized to nest within the base frame 120 and can be vertically elevated by extension of the lifting cylinders 124. The subframe 126 mounts two pairs of actuating cylinders 128 that can be coupled with the linkage 80 on the tree second frame 42 to effect lifting and lowering thereof. Advantageously, as will be subsequently described, the actuating cylinders 128 are mounted in a manner such that they exert an inwardly directed horizontal pulling force on the linkage 80 when the second frame 42 is lowered to cause compression of the meat product loaded on the overlying press tree 32.

Each pair of actuating cylinders 128 is mounted on a pair of trunnions that extend transversely within the subframe 126. The trunnions 130 are mounted at the end of the actuating cylinders 128 from which piston rods 132 extend. The mounting of the trunnions 130 at the end of the actuating cylinders 128 causes the cylinders to be imbalanced and the weight of the cylinders urges their rotation in a direction which causes elevation of the piston rods 132.

The pairs of actuating cylinders 128 extend in opposite directions towards the ends of the subframe 126. The piston rods 132 in each pair of cylinders 128 are connected to a beam 134 that carries a pair of closely spaced apart grips 136. The grips 136 each include an elongated notch 138 that is cut into an upper edge of the grips 136. As can best be seen in FIG. 14, the grips 136 are constructed so that the notches 138 can capture the lever pin 93 on the clevis 82 so that extension and retraction of the piston rods 132 can effect rotational movement of the clevis 82 and resulting vertical movement of the press tree second frame 42. A bevel 140 is preferably placed at both ends of each notch 138 to facilitate placement of the lever pin 93 into the notch 138.

The actuating cylinders 128 are operatively coupled together so that the piston rods 132 extend and retract in unison. The actuating cylinders 128 are double acting cylinders so that a force may be applied by the cylinders during extension and retraction of the piston rods 132. Various types of cylinders such as hydraulic or pneumatic cylinders can be utilized for this purpose.

One trunnion in each pair of trunnions 130 is mounted on a subframe side member 141 while the other paired trunnion is mounted on a longitudinally extending center beam 142 that is supported by transverse end beams 143. Center beam 142 also mounts a positioning member 144 that cooperates with alignment arms 146 that extend downwardly from beam 78 on press tree 32 to insure that the dolly 37 is properly aligned with the press tree 32 when raising and lowering of the press tree second frame 42 is desired.

The dolly subframe 126 is elevated to bring the actuating cylinders 128 into engagement with the overlying press tree 32 by extension of the lifting cylinders 124 that couple the subframe 126 with the dolly base frame 120. As can best be seen in FIGS. 3, 5 and 7, the lifting cylinders 124 are coupled with the subframe 126 by a linkage denoted generally by the numeral 148. The linkage 148 includes longitudinally extending rods 150a and 150b that are mounted to the longitudinal beams 152 of base frame 120 by pillow block bearings 154. The longitudinal rods 150a and 150b are rotatable within the pillow block bearings 154 and are joined together by a tie rod 156 that is pivotally connected at both ends to short links 158 that are fixed on the longitudinal rods 150a and 150b. One end of the tie rod 156 preferably includes an axially aligned finger element 160 that is threaded and is received within a knuckle 162 that is pivotally connected to the short link 158. Nuts 164 which are threaded on the finger element 160 bear against the knuckle to fix the axial position of the finger element 160 within knuckle 162. This arrangement allows the axial extension of the finger element 160 through the knuckle 162 to be adjusted and thereby allow the short links 158 to which the tie rod 160 is attached to be positioned with respect to each other as desired.

The longitudinal rods 150a and 150b rotate in unison as a result of being connected by the tie rod 156 and short links 158. Longitudinal rod 150b also mounts another link 166 that is aligned with and is slightly longer than short link 158. Link 166 is fixed on rod 150b so that it rotates therewith, while the other end of the link 166 is pivotally connected to the end of a piston rod 168 of lifting cylinder 124. As a result of the connection between piston rod 168 and link 166, extension and retraction of the piston rod 168 results in corresponding rotation of longitudinal rod 150b, as well as longitudinal 150a because of the use of tie rod 156 to connect the longitudinal rods.

Longitudinal rod 150b also mounts a fixed link 170 that is pivotally connected at its free end to a midpoint of a lever arm 172. An upper end of the lever arm 172 is connected at its upper end to the subframe 126 by a pivot pin 174 that is carried on a mounting plate 176. A lower end of the lever arm 172 mounts a wheel 178 that travels along a suitable track 180 extending between the base frame longitudinal beams 152. The use of wheel 178 at the lower end of lever arm 172 serves to stabilize the lever arm 172 as the connecting link 170 is rotated by the longitudinal rod 150b. The pivoting connection between the connecting link 170 and lever arm 172 allows those components to move in a scissor like relation to each other to effect vertical lifting and lowering of the subframe 126 as the lifting cylinder piston rods 168 are extended and retracted. The subframe 126 is maintained in a horizontal or level orientation during lifting and lowering by a pair of scissor links 182 and 184. Link 182 is fixed to longitudinal rod 150a and is pivotally connected at its free end to the other link 184. Link 184 is in turn pivotally connected by a pin 174 to another mounting plate 176 carried on subframe 126. The construction of linkage 148 using scissor links 182 and 184 and lever arm 172 with its connecting link 170 allows the subframe 126 to be raised and lowered along a precise vertical path with a minimum of back and forth movement. This insures that the grips 136 carried on the actuating cylinders 128 can be coupled with the lever pin 93 on the overlying press tree clevis 82 once the press tree 32 is brought into registry over the dolly 37. An upright stop 186 is also carried on the subframe 126 and is of a height to contact the press tree 32 to place it in the desired registry as it is moved laterally along the overhead rail 34.

A control box 188 is mounted on the base frame 120 and contains the necessary electrical circuitry or pneumatic logic required to control operation of the lifting cylinders 124 and actuating cylinders 128. Any of various types of circuitry and logic controls can be utilized and are well within the knowledge of those skilled in the art. To facilitate operator actuation of the dolly 32, suitable foot control pedals 190 are positioned at the front of the dolly 37 and are operatively connected through the control box 188 to the cylinders 124 and 128. Four pedals 190 are preferably supplied, one of which controls the raising of subframe 126 by extension of lifting cylinders 124, another controls lowering of subframe 126 by retraction of cylinders 124, one controls the raising of press tree second frame 42 by extension of the actuating cylinders 128, and the other pedal controls the lowering of the second frame 42 by retraction of cylinders 128.

In use, a single dolly 37 can be utilized to move a plurality of press trees 32 between open and closed configurations by moving successive trees 32 into registry over the dolly 37. Notably, the dolly 37 has a low profile even with the subframe 126 in the elevated position. This allows the lowermost product molds 40 to be located close to the floor surface so that a number of product molds 40 can be carried on the press tree 32 and still remain within easy reach of the operator responsible for loading and unloading the meat product into the molds 40.

Figure 3:
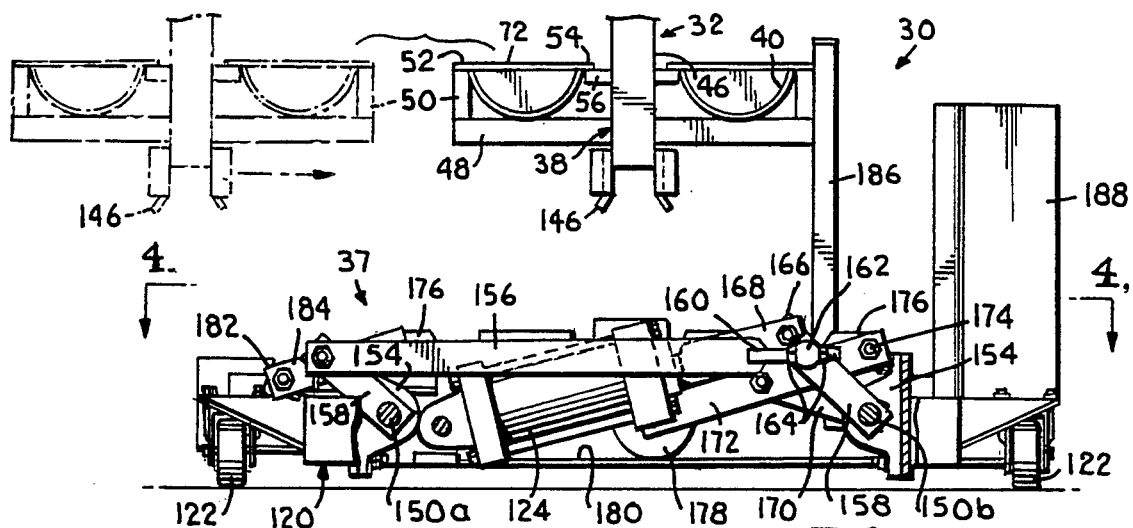
FIG. 3 is an end elevational view of the actuating dolly in the retracted position shown in FIG. 2 and a fragmental portion of the press tree, phantom lines being used to illustrate the direction of movement of the press tree into registry with the dolly.
Figure 5:
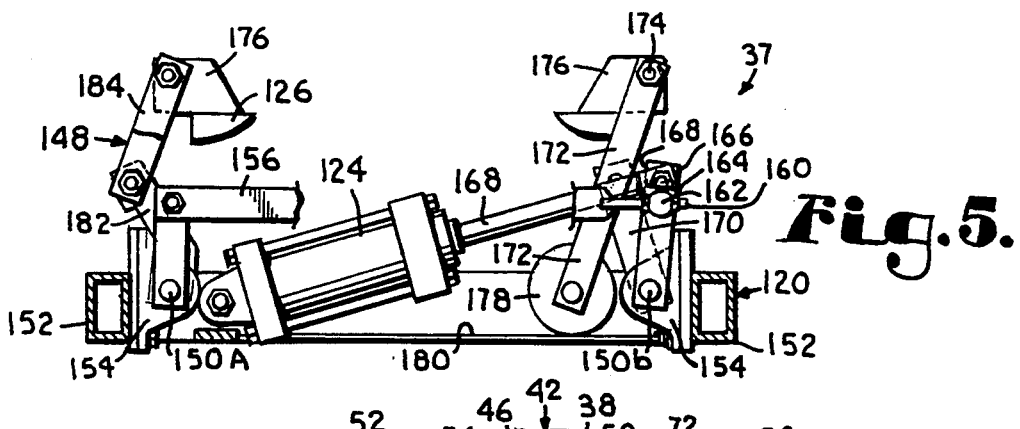
FIG. 5 is an end elevational view of the actuating dolly taken along line 5—5 of FIG. 1 in the direction of the arrows, portions of the dolly being broken away to shown a subframe cylinder in its extended position which causes elevation of the subframe.
Figure 7:
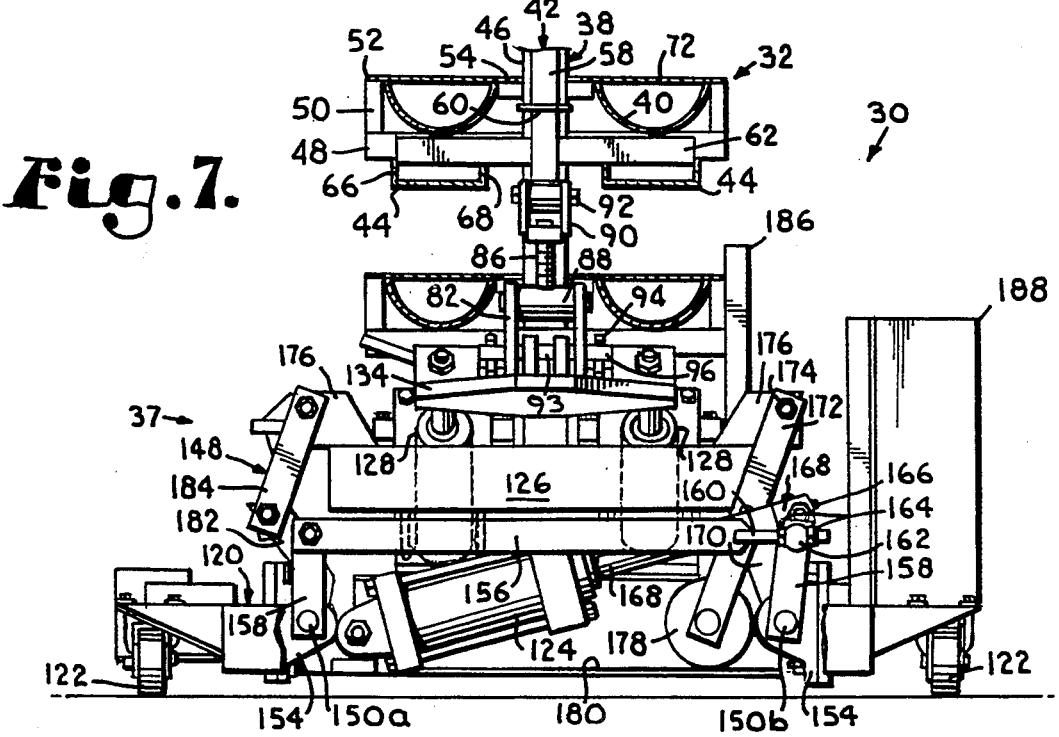
FIG. 7 is an end elevational view of the actuating dolly engaged with the press tree, portions of the dolly being broken away for illustration purposes and the press tree being shown in fragment.

In use, the dolly 37 is positioned at a location where loading and/or unloading of the press tree 32 is to occur. The press tree 32 is then brought into registry overlying the dolly 37 as illustrated in FIG. 3, such as by moving the tree along the overhead rail 34. Initial registration of the tree 32 with the dolly 37 is achieved by bringing the tree into contact with the upright stop 186 that extends upwardly from the dolly subframe 126.

When the tree 32 is to be loaded, it is held in the open configuration with the press plates 44 spaced above the underlying product molds 40, such as shown in FIG. 2, by engagement of the catch 110 on the latch second portion 108 with the latch pin 96 carried on clevis 82, such as illustrated in FIG. 2. The meat product is then loaded into the product molds 40 and the dolly 37 is actuated in the following manner to cause movement of the tree second frame 42 in relation to the first frame 38 and thereby move the press plates 44 toward the product molds 40 with resulting compression of the meat products.

Actuation of the appropriate foot pedal 190 on the dolly 37 causes the lifting cylinders 124 to extend their piston rods 168 to cause elevation of the subframe 126. Concurrently with, or prior to full elevation of the subframe 126, the actuating cylinders 128 mounted on subframe 126 are activated by one of the foot pedals 190 to cause extension of piston rods 132. This causes the grips 136 carried on the rods 132 to be positioned whereby they will engage the clevis 82 when the subframe 126 is fully elevated, as shown in FIG. 6. The subframe 126 is fully elevated when the center positioning member 144 carried on dolly subframe 126 is fully received within the alignment arms 146 that extend downwardly from the tree first frame 38.

Figure 13:
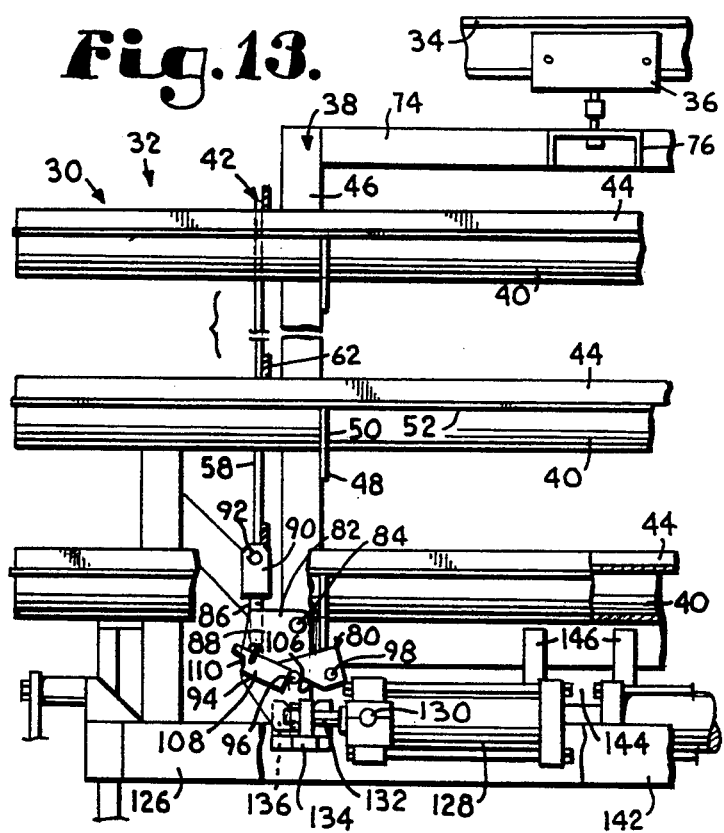
FIG. 13 is a fragmentary side elevational view of the actuating dolly engaged with the linkage of the press tree, the press tree having been moved to a closed configuration by operation of the dolly, portions of the dolly and tree being broken away for purposes of illustration.

After the dolly 37 has been engaged with the press tree 32 as shown in FIG. 6, the latch 94 is disengaged from the clevis 82 by lifting the handle 112 to remove the catch 110 from the lever pin 96. The piston rods 132 in actuating cylinders 128 are then retracted to cause the outer end of the notch 138 in each grip 136 to engage the lever pin 93 on clevis 82. Continued retraction of the piston rods 132 causes the clevis 82 to rotate in a counterclockwise direction, as viewed in FIGS. 13–14, until the latch catch 106 engages the latch pin 96. This movement of the clevis 82 in turn causes the second frame 42 to be pulled downwardly to exert a compression force on the meat products between the press plates 44 and the product molds 40. Notably, because the actuating cylinders 128 are free to rotate on the trunnions 130 to which they are mounted, the inclination of the cylinders 128 automatically adjusts to the position of the lever pin 93 as it orbits about the clevis pivot pin 84. When the maximum pulling force is being exerted by the cylinders 128 on the second frame 42 through linkage 80, the cylinders are substantially horizontally disposed, as shown in FIG. 13. This is particularly advantageous because the cylinders 128 then exert equal but oppositely directed forces, thereby reducing the torsional forces experienced by the components of dolly 37.

The second frame 42 is locked into the compressed configuration by engagement of the latch catch 106 with the latch pin 96 on the clevis 82. The press tree 32 can then be maneuvered into an oven for cooking of the compressed meat product to form the cooked product which conforms to the shape of the product molds 40. Once cooking has been completed, the press tree 32 can be returned to the same or another dolly 37 to move the second frame 42 to the open configuration to allow unloading of the cooked meat product. Opening of the tree 32 is accomplished in a manner similar to that described above for moving the second frame 42 to the compressed configuration, with the exception that the piston rods 132 of the actuating cylinders 128 are moved from the retracted to extended position to cause movement of the clevis 82 in the opposite direction. Rotation of the clevis 82 is complete when the latch catch 110 engages the latch in 96 on the clevis to lock the second frame in the upwardly extended position, such as is shown in FIG. 1.

The meat press 30 is particularly notable in that a large compression force can be applied by the press tree 32 onto the meat product without causing significant deformation of the components of the tree 32. The center positioning of first frame vertical members 46 and second frame vertical bars 58 facilitates the application of these large forces because they allow the product molds 40 and press plates 44 to be positioned adjacent the front and back sides of those vertical frame components. This close placement of the product molds 40 and press plates 44 to the vertical members 46 and bars 58 allows relatively short horizontal bars 48 and 62 to be used to support the product molds and press plates. Because of their short length these horizontal bars 48 and 62 are less likely to bend under the applied load. In addition to the materials savings achieved by such a construction, large reductions in weight can also be realized. This allows the press trees 32 to be more maneuverable and less likely to contribute to operator fatigue.

The press tree 32 also facilitates loading and unloading of the meat product because access to the product molds 40 is not impeded by portions of the frame as is the case with convention meat presses that utilize a rectangular frame arrangement. The large number of meat products that can be loaded onto the press tree 32 is achieved by the stacking of the product molds 40 at successive tiers and by placing the lowermost molds 40 close to the floor surface. Despite the ability to position the molds 40 within approximately one foot or less of the floor surface, the tree 32 and dolly 37 are constructed in a manner so that large vertically directed compression forces can be applied to the meat products in the molds 40. The use of linkage 80 and the inclined actuating cylinders 128 are particularly important in this regard because they allow a long cylinder stroke to be utilized without the additional clearance that would be required if the actuating cylinders were vertically mounted. As a result, a low dolly profile can be achieved while still allowing for the cylinder stroke required to fully open the press plates 44 and provide ready access to the product molds 40. The low height of the dolly 37 is also facilitated by the linkage 148 that connects the base frame 120 with the subframe 126 and allows for vertical movement of the subframe 126. The linkage 148 is designed to permit the lifting cylinders 124 to be inclined at an angle of 45° or less to the horizontal so that a long cylinder stroke can be achieved. This allows the dolly 37 to have an extremely low profile when in the retracted position so that the press tree 32 can be easily maneuvered into position. The dolly subframe 126 can then be extended upward to engage and operate the press tree 32.

It will also be appreciated that a single dolly 37 can be used to load and unload multiple press trees 32. This further contributes to materials and costs savings in comparison to those meat presses that have an actuating mechanism dedicated to each press. Yet, despite the ability of the dolly 37 to be used to successively load and unload a large number of press trees 32, it can be readily engaged with and disengaged from the press tree 32 with a minimum of operator exertion. Because of the ease with which the dolly 37 can be actuated using foot pedals 190, the operator is also able to quickly move the press tree to the desired position for loading or unloading of the meat product.

Turning now to FIGS. 16–18, an alternate embodiment of a press tree 332 will now be described. Press tree 332 is identical in most respects to press tree 32 previously described and like referenced numerals preceded by the prefix "3" have been utilized to denote similar components. Press tree 332 differs from that previously described in that the product molds 340 that are supported on flat bars 348 are of rectangular rather than arcuate cross section. Each product mold is also compartmentalized into a plurality of smaller sections by a series of dividing walls 341 that are spaced apart along the length of each mold 340. Each mold 340 further includes a plurality of holes 343 in the bottom of the mold. One hole 343 is located in each section defined by the dividing walls 341 and receives a push pin 345 that extends downwardly from a support plate 347 sized to fit within each mold section. The support plate 347 normally rests on the bottom of the mold 340 but can be elevated therefrom by exerting an upward force on the push pin 345. As will be subsequently described, this facilitates removal of a cooked meat product 349 from within each mold section.

The press plates 344 are mounted to horizontal bars 362 carried on vertical bars 358 of second frame 342. The press plates 344 also carry on their top surface a longitudinally extending rail 351 that is positioned to engage the push pins 345 that extend downwardly through the overlaying product molds 340. The rails 351 include openings 353 that are sized and positioned to receive the push pins 345. The openings 353 can be covered by a suitable sleeve 355 so that the push pin 345 is supported on the sleeve instead of being permitted to extend through the associated opening 353. The sleeves 355 can be joined together by a suitable linkage 357 so that they can be operated in unison, such as by moving a handle 359 that is fixed to the linkage 357.

The rails 351 are elevated by suitable spacers 361 above the top surface of the associated press plate 344 so that when the press plate is fully opened as is shown in FIG. 18, the push pin 345 and associated support plate 347 are moved upwardly to bring the cooked meat product 349 out of the mold 340 so that it can be easily grasped and removed. To achieve this desired elevation of the push pin 345, the sleeve 355 is positioned covering the opening 353 so that the bottom end of the push pin 345 is supported on the sleeve 355. After removal of the cooked meat product 349, the sleeves 355 can be moved to uncover the opening 353 so that the push pin can drop through the opening and be supported directly on the top surface of press plate 344. This lowers the support plate 347 within the mold 340 so that an uncooked meat product can be loaded into the mold 340 and can be retained in place by that portion of the walls of mold 340 that extend upwardly beyond the support plate 347. Once all of the product molds 340 have been loaded, the press plates 344 can then be lowered to cause compression of the meat product within the molds 340. FIG. 17 depicts the press tree 332 as the press plates 344 are being lowered to contact the uncooked meat product 349. Press tree 332 can otherwise be operated in the same manner as previously described with respect to tree 32 and has the same advantages attendant thereto.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A press for compressing meat products during cooking thereof, said press comprising:
    a first frame comprising a pair of spaced apart vertically extending members;
    a second frame vertically movable in relation to said first frame and comprising a pair of spaced apart vertically extending members;
    a plurality of support plates positioned on said first frame;
    a plurality of press plates carried on said second frame, each of said press plates being movable with said second frame between a first position spaced above an immediately underlying support plate and a second position spaced more closely to the immediately underlying support plate to cause compression of a meat product when positioned on said support plate;
    a linkage connecting said first and second frames and operable to cause vertical movement of said second frame in relation to said first frame;
    a cylinder mounted on a vertically extendable subframe and including an extensible and retractable rod; and
    a connection mounted on said cylinder rod and engagable with said linkage to cause said vertical movement of said second frame when the cylinder rod is extended and retracted, said connection being brought into contact with said linkage by vertical extension of said subframe.

2. The press as set forth in claim 1, wherein some of said press plates and support plates extend along a front side of said vertically extending members of the first and second frames and others of said press plates and support plates extend along a back side of said vertically extending members of the first and second frames.

3. The press as set forth in claim 2, wherein said support plates are arcuate in cross-section.

4. The press as set forth in claim 1, including a second linkage connecting said first and second frames and spaced from said first mentioned linkage, said second linkage being connectable with a connection mounted on an extensible and retractable rod of a second cylinder mounted on said subframe to cause said vertical movement of the second frame in relation to said first frame.

5. The press as set forth in claim 4, including trunnions mounting said first and second cylinders on the subframe to permit pivoting movement of said first and second cylinders, said first and second cylinders being positioned to extend in a substantially horizontal orientation and in opposite directions when the connections are engaged with the first and second linkages and said rods are being retracted to cause downward movement of said second frame in relation to said first frame and resulting movement of said press plates to the second position to cause compression of said meat products when loaded on the support plates.

6. The press as set forth in claim 5, wherein said folding linkage connecting said base frame with the subframe includes a lever arm supported and movable along a track mounted on the base frame, said lever arm being coupled with said subframe and an extensible and retractable piston rod of the lifting cylinder, whereby movement of said piston rod in one direction causes said lever arm to lift said subframe to cause vertical movement thereof.

7. The press as set forth in claim 6, wherein said lifting cylinder is inclined at an angle of less than 45° to the horizontal.

8. A press for compressing meat products during cooking thereof, said press comprising:
   a first frame comprising a pair of spaced apart vertically extending members;
   a second frame vertically movable in relation to said first frame and comprising a pair of spaced apart vertically extending members;
   a plurality of support plates positioned on said first frame;
   a plurality of press plates carried on said second frame, each of said press plates being movable with said second frame between a first position spaced above an immediately underlying support plate and a second position spaced more closely to the immediately underlying support plate to cause compression of a meat product when positioned on said support plate;
   a first linkage connecting said first and second frames and operable to cause vertical movement of said second frame in relation to said first frame;
   a first cylinder mounted on a vertically extendable subframe and including an extensible and retractable rod;
   a first connection mounted on said rod of the first cylinder and engagable with said first linkage to cause said vertical movement of said second frame when the rod of the first cylinder is extended and retracted;
   a second linkage connecting said first and second frame and spaced from said first linkage;
   a second cylinder mounted on said subframe and including an extensible and retractable rod; and
   a second connection mounted on said rod of the second cylinder and engagable with said second linkage to cause said vertical movement of said second frame when the rod of the second cylinder is extended and retracted;
   a base frame connected by a folding linkage to the subframe; and
   an extensible and retractable lifting cylinder mounted on said base frame and coupled with said folding linkage to cause said vertical movement of the subframe as the lifting cylinder is extended and retracted.

9. A press for compressing meat products during cooking thereof, said press comprising:
   a first frame comprising a pair of spaced apart vertically extending members;
   a second frame vertically movable in relation to said first frame and comprising a pair of spaced apart vertically extending members;
   a plurality of support plates positioned on said first frame;
   a plurality of press plates carried on said second frame, each of said press plates being movable with said second frame between a first position spaced above an immediately underlying support plate and a second position spaced more closely to the immediately underlying support plate to cause compression of a meat product when positioned on said support plate;
   a first linkage connecting said first and second frames and operable to cause vertical movement of said second frame in relation to said first frame;
   a first cylinder mounted on a vertically extendable subframe and including an extensible and retractable rod;
   a first connection mounted on said rod of the first cylinder and engagable with said first linkage to cause said vertical movement of said second frame when the rod of the first cylinder is extended and retracted;
   a second linkage connecting said first and second frame and spaced from said first linkage;
   a second cylinder mounted on said subframe and including an extensible and retractable rod; and
   a second connection mounted on said rod of the second cylinder and engagable with said second linkage to cause said vertical movement of said second frame when the rod of the second cylinder is extended and retracted;
   trunnions mounting said first and second cylinders on the subframe to permit pivoting movement of the first and second cylinders, wherein said first and second cylinders are positioned to extend in a substantially horizontal orientation and in opposite directions when the connections are engaged with the first and second linkages and said rods are being retracted to cause downward movement of said second frame in relation to said first frame and resulting movement of said press plates to the second position to cause compression of the meat products when loaded on the support plates.

* * * * *